Patented June 28, 1938

2,121,823

UNITED STATES PATENT OFFICE 2,121,823

MANUFACTURE OF SULPHONIUM COMPOUNDS

Henry Alfred Piggott, Blackley, Manchester, England, assignor to Imperial Chemical Industries Limited, a corporation of Great Britain No Drawing. Application June 22, 1935, Serial No. 28,013. In Great Britain June 29, 1934

11 Claims. (Cl. 260—99.12)

This invention relates to the manufacture of new sulphonium compounds containing at least one saturated or unsaturated chain of at least twelve carbon atoms. More particularly, the invention relates to new sulphonium salts containing an alkyl group having a chain containing from twelve to eighteen carbon atoms. The invention also relates to certain dialkyl monosulphides from which these new sulphonium compounds are made.

This case is a continuation in part of copending application No. 724,631 filed May 8, 1934, which has matured into Patent No. 2,044,099, and covers certain sole inventions of the applicant which were disclosed in said prior application.

While hexyl dimethyl sulphonium hydroxide, methyl ethyl hexyl sulphonium hydroxide, methyl ethyl octyl sulphonium hydroxide, phenyl-ethyl dimethyl sulphonium hydroxide, decyl dimethyl sulphonium hydroxide, and various salts of the aforesaid sulphonium bases are known (see for example, Liebig's Annalen der Chemie, vol. 472, pages 137-142), it does not appear that sulphonium salts or bases which contain alkyl groups having chains of twelve or more carbon atoms have been prepared prior to the present invention. Furthermore, it does not appear that the previously known sulphonium compounds have the extensive and varied technical utility which characterizes the products of the present invention. Moreover, since ethyl iso-amyl sulphide interacts with methyl iodide to give trimethyl sulphonium iodide (v. Saytzeff, Liebig's Annalen, 144, 145), it could not surely be foretold that long chain sulphonium salts could be obtained by the process of this invention.

This invention has as an object the preparation of new sulphonium compounds containing an aliphatic radical having a chain of twelve or more carbon atoms. A further object of the invention is to provide novel and easily conducted processes whereby these new sulphonium compounds may be prepared. A still further object is to prepare new dialkyl sulphides from which some of these new sulphonium compounds may be produced. A still further object is to prepare new chemical compounds which have a variety of valuable technical and synthetic uses. Other objects will appear hereinafter.

These objects are accomplished by the following invention according to which new sulphonium compounds are prepared by interacting various dialiphatic monosulphides or mixed aromatic aliphatic monosulphides with aralkyl halides, alkyl halides, dialkyl sulphates, and alicyclic halides. Some of these dialiphatic sulphides are prepared by interacting an alkyl mercaptan with an alkyl halide or with a dialkyl sulphate as will more fully hereinafter appear. In its preferred form, this invention involves the preparation of new sulphonium compounds by reacting dimethyl sulphate, benzyl chloride, methyl bromide, butyl chloride, and cyclohexyl chloride with a dialkyl monosulphide in which one of the alkyl groups contains a chain of twelve carbon atoms, or with a benzyl alkyl monosulphide in which the alkyl group contains a chain of twelve or more carbon atoms.

In order that the invention may be more concretely illustrated, a few specific examples will be set forth, after which a few of the modifications, substitutions, variations, and equivalents as fall within the scope of the invention will be mentioned.

The following examples in which parts are by weight illustrate but do not limit the invention.

Example 1

100 parts of methyl cetyl sulphide (made as described below), and 47 parts of dimethyl sulphate are heated together for 1 hour at 100° C. On cooling, the product slowly sets to a white crystalline mass of dimethyl cetyl sulphonium methyl sulphate. It may be purified by crystallizing from acetone.

Methyl cetyl sulphide is made as follows:—100 parts of cetyl mercaptan, 450 parts of 2 N sodium hydroxide and 500 parts of water are mixed and 95 parts of dimethyl sulphate are added whilst stirring vigorously over 2 hours. The liquid is then distilled in steam, the distillate extracted with ether, and the residue from evaporation of the extract distilled. Methyl cetyl sulphide is obtained as a colorless liquid, B. P. 210–214°/20–30 mm. Cetyl mercaptan may be prepared by treating cetyl bromide with sodium hydrosulphide in alcohol.

Example 2

A mixture of 264 parts of methyl dodecyl sulphide (prepared as described below) and 165 parts of dimethyl sulphate is heated at 90–100° C. until water-soluble, and then allowed to cool. Dimethyl dodecyl sulphonium methyl sulphate sets as a solid mass, and may be recrystallized from acetone. It dissolves in water to a colorless foaming solution with good wetting properties.

Methyl dodecyl sulphide is made from dodecyl mercaptan in the same way as methyl cetyl sulphide is made from cetyl mercaptan in Example 1. Dodecyl mercaptan itself is a recently discovered compound. It may be made in the same way as cetyl mercaptan (loc. cit.). Dodecyl mercaptan may also be prepared according to the methods described in British Patent No. 401,118; French Patent No. 751,117; pages 1090–1094 in vol. 55, of the Journal of the American Chemical Society; pages 1166–1167 of vol. 51 of Recueil des travaux chimiques des Pays-Bas; or pages 273 T and 274 T of the Journal of the Society of Chemical Industry for August, 1933.

Example 3

A mixture of 10 parts of dimethyl sulphate and 40 parts of dicetyl sulphide is heated at 100° C. until the product is completely soluble in water. On cooling a hard crystalline mass of dicetyl methyl sulphonium methyl sulphate is obtained; this is purified by crystallizing from acetone, when it has M. P. 130–134° C.

Example 4

Dodecyl dimethyl sulphonium bromide is made by heating 100 parts of methyl dodecyl sulphide with 45 parts methyl bromide until a completely water-soluble product is obtained.

Example 5

100 parts of benzyl cetyl sulphide (made as described below) and 37 parts of dimethyl sulphate are heated together at 100° C. until a sample dissolves completely in water. The mixture is then cooled, when it sets to a white crystalline mass of methyl benzyl cetyl sulphonium methyl sulphate; this may be purified by crystallizing from acetone, from which minute colorless plates, M. P. 75–80° C. are obtained.

Benzyl cetyl sulphide is made as follows:— 8.5 parts of sodium are dissolved in 100 parts of methanol and 100 parts of cetyl mercaptan (Fridau, Annalen, 1852, 83, 18) are added. The mixture is boiled and 47 parts of benzyl chloride are added in one hour. The mixture is cooled and water is added until no more oil separates; the oil is extracted with ether, and the etheral extract distilled in a vacuum, the fraction B. P. 160–180°/18 mm. being collected.

Example 6

According to an alternative plan, methyl benzyl cetyl sulphonium methyl sulphate is made as follows:—

1000 parts of cetyl mercaptan are treated with 85 parts of sodium in methanol and then heated for 1 hour at about 80° C. with 470 parts of benzyl chloride. The product is poured into water, extracted with ether, the etheral layer distilled and the fraction B. P. 250–260°/40 mm. collected. 100 parts of benzyl cetyl sulphide are heated with 37 parts of dimethyl sulphate at about 80° C. for about ¾ hour and then cooled when the methyl benzyl cetyl sulphonium methyl sulphate crystallizes.

Example 7

Benzyl methyl dodecyl sulphonium methyl sulphate is obtained by treating the mercaptan derived from dodecyl bromide with a mixture of sodium ethoxide and benzyl chloride and finally treating the resulting product with dimethyl sulphate. Alternatively, this compound may be made by treating benzyl dodecyl sulphide (made according to the process described in British Patent No. 401,118) with dimethyl sulphate,

Example 8

Benzyl methyl dodecyl sulphonium chloride is made by heating 216 parts of dodecyl methyl sulphide with 117 parts benzyl chloride at 80–90° C. with stirring until a completely water-soluble compound is produced.

Example 9

Benzyl ethyl dodecyl sulphonium chloride is prepared by heating 23 parts of ethyl dodecyl sulphide with 12 parts of benzyl chloride under the same conditions as in Example 8 above. Ethyl dodecyl sulphide is prepared by reacting dodecyl mercaptan and ethyl chloride in the presence of caustic soda.

Example 10 m-Nitrobenzyl methyl sulphide was reduced by stirring with strong concentrated hydrochloric acid and gradual addition of granulated tin, the reaction being allowed to proceed under its own heat. When all the original nitro compound has passed into solution a large excess of caustic soda liquor was added and the product was steam distilled. The distillate was saturated with salt and extracted with ether. The ethereal extract was evaporated. 16 parts of the crude amino compound thus obtained were suspended in 1000 parts of aqueous 4% caustic soda and 61 parts of stearyl chloride were added slowly at room temperature with good agitation. The product was then extracted with ether, the ethereal extract washed with water to remove soap, and the ether then removed by distillation. The solid residue was crystallized from 85% alcohol and thus obtained as a white powder, M. P. 80° C.

32 parts of this product were heated with 10 parts of dimethyl sulphate at 120° C. for ½ hour. A water soluble product was obtained which was purified by crystallization from alcohol or a mixture of alcohol and acetone. It is advisable to avoid undue prolongation of the heating during this final condensation as secondary changes occur giving water insoluble products.

m-Nitrobenzyl methyl sulphide is prepared by methylating the corresponding mercaptan with methyl iodide and alcoholic sodium methoxide (cf. Lutter, Ber. 1897, 30, 1070). m-Nitrobenzyl mercaptan is obtained by condensing m-nitrobenzyl chloride with sodium thiosulphate in alcohol and hydrolyzing the resulting m-nitrobenzyl thiosulphate with dilute sulphuric acid at 95° (cf. Price and Twiss, J. C. S. 1909, 95, 1727).

Example 11

Methyl butyl hexadecyl sulphonium chloride may be prepared by heating methyl hexadecyl sulphide and butyl chloride together. Methyl butyl tetradecyl sulphonium chloride and methyl butyl dodecyl sulphonium chloride may be prepared in a similar manner by using methyl tetradecyl sulphide and methyl dodecyl sulphide in place of methyl hexadecyl sulphide.

Example 12

Methyl butyl hexadecyl sulphonium methyl sulphate may be made by heating butyl hexadecyl sulphide with dimethyl sulphate. In a similar manner methyl butyl tetradecyl sulphonium methyl sulphate and methyl butyl dodecyl sulphonium methyl sulphate can be prepared by using butyl tetradecyl sulphide and butyl dodecyl sulphide in place of butyl hexadecyl sulphide.

Example 13

Methyl benzyl hexadecyl sulphonium chloride is made by heating hexadecyl methyl sulphide with benzyl chloride until a completely water-soluble compound is produced.

Example 14

Methyl cyclohexyl hexadecyl sulphonium chloride is made by interacting cyclohexyl chloride with methyl hexadecyl sulphide.

Example 15

Para cetyl phenyl dimethyl sulphonium methyl sulphate. This compound is made as follows:—
Para cetyl phenol is reacted with phosphorus pentasulphide and thereby converted to para cetyl thio phenol. The sodium salt of para cetyl thio phenol is reacted with methyl iodide to form para cetyl phenyl methyl sulphide. Para cetyl phenyl methyl sulphide is converted to para cetyl phenyl dimethyl sulphonium methyl sulphate by reacting it with dimethyl sulphate.

Example 16

Dimethyl sulphide (65 parts) is heated with oleyl p-toluenesulphonate (422 parts) at 100° in a closed vessel until a water soluble product is obtained. Oleyl p-toluenesulphonate is prepared in a similar manner to that described by Sekera and Marvel, J. Amer. Chem. Soc. 1933, 55, 345, for saturated higher alkyl p-toluenesulphonates.

Example 17

25 parts of stearyl chloride were added cautiously to 9 parts of methyl β-hydroxyethyl sulphide with good agitation. When the addition was completed the mixture was heated to 90–100° for ½ hour and after cooling dissolved in ether and thoroughly washed with 2% aqueous sodium carbonate. The ethereal extract was evaporated and the residue distilled in a vacuum. There were thus obtained 15.5 parts of product, B.P. 216°/5 mm. This was converted into its methosulphate by heating to 100° with the calculated amount of dimethyl sulphate. The solid product was crystallized from alcohol or acetone and formed colourless crystals readily soluble in water to a strongly foaming colourless solution. The preparation of methyl β-hydroxyethyl sulphide was carried out as described in Organic Syntheses, New York, 1934, p. 54.

As can be seen from the foregoing examples, this invention relates generally to the preparation of sulphonium compounds having the general formula:

$$R-\underset{\underset{R''}{|}}{\overset{\overset{R'}{|}}{S}}-X$$

in which R stands for a group which contains an aliphatic radical having a chain of twelve or more carbon atoms; R' denotes an alkyl group; R" represents an alkyl, aralkyl or alicyclic group containing from one to eight carbon atoms; and X stands for OH or an acid radical.

R preferably stands for an alkyl group containing from twelve to eighteen carbon atoms, such as dodecyl, tetradecyl, hexadecyl or octadecyl. R may also stand for stearamido-benzyl, para cetyl phenyl or a higher alkylene radical e. g. octadecenyl.

R' denotes an alkyl group which may contain from one to eighteen carbon atoms. Preferably, R' stands for a short alkyl group such as methyl or ethyl, but it may denote a longer alkyl group such as butyl, hexyl, heptyl, octyl, dodecyl or cetyl.

R" may represent an alkyl, aralkyl or alicyclic group containing from one to eight carbon atoms. Preferably, R" stands for a benzyl, methyl or ethyl group. R" may also represent a butyl, hexyl, heptyl, tolyl-methyl, phenyl-ethyl, cyclopentyl, cyclohexyl, methyl cyclohexyl, or dimethyl cyclohexyl group.

X preferably stands for a halide atom or for a methyl sulphate group. X may also stand for a phosphate, a dimethyl ortho phosphate, a borate, a sulphite, a thio sulphate, an acetate, an oxalate, a citrate radical, the radical of an organic sulphonic acid, e. g. p-toluenesulphonic acid or a hydroxide radical.

The new compositions covered in this case belong to the class of surface active or capillary active materials in that they have colloidal properties and may therefore be advantageously used in any process involving wetting, penetrating, deterging, dispersing, emulsifying, frothing, foaming, and kindred phenomena. These compositions may be employed in pure or standardized form, and if desired, in conjunction with known processing or treating agents. They may be used by themselves or in combination with other surface active agents in any relation in which surface active agents having colloidal properties have heretofore been used.

Many uses of these new compositions are connected with treatments for processing and improving natural and synthetic textile materials. A few representative uses of these new products as textile assistants will be mentioned in order that the importance and widespread applicability of these new products in the textile industries may be fully appreciated. They may be used alone or in combination with other suitable detergents for cleansing and scouring vegetable and animal fibers when removing fatty or oily materials. They may be used as penetrants in acid solutions which are used for carbonizing vegetable matter in wool. When added to flax retting baths, they function as wetting and penetrating agents. They may be employed as assistants in fulling and felting processes. They may be used in sizing preparations in combination with the usual materials such as starches or gelatine or their equivalents, clays, talcs or their equivalents, weighting salts such as magnesium sulfate or calcium chloride, oils and oils processed by oxidization, polymerizing, sulfonation, etc. The penetrating power of these new compositions is utilized with advantage when they are added to baths containing starch ferments which are employed for removing sizing from textile materials. These products function as useful wetting, cleansing, and penetrating agents in bleaching liquors such as those used in the kier boiling of cotton goods. They may be added to the lye liquors used for mercerizing cotton goods. They improve the absorption capability of fibrous materials when such materials are subjected to treatments for finishing, softening, stiffening, coloring, impregnating, waterproofing, and mildew-proofing. They may be used alone or in combination with other materials for lustering or delustering fabrics. They may be employed to oil or lubricate textile materials and as assistants in processes of weighting or loading fabrics. They may be used as assistants in silk degumming liquors and silk soaking solutions. They can also be used to assist in twist setting in yarn and in processes of stripping colors. The use of these compounds as assistants in processes of stripping dyes from dyed textile materials is an invention of Evans and Piggott covered in U. S. Patent No. 2,061,621.

Another important class of uses of these new compositions is as assistants in the preparation and application of dyestuffs. They may be used in the preparation of dyestuffs in readily dispersible form and for the production of inorganic pigments or pigments of azo, basic, acid, vat, and sulfur dyes in a finely divided condition. As penetrants and wetting agents they assist in producing level dyeings in neutral, acid, or alkaline dyeing baths. They facilitate dyeing with developed dyes, the dyeing of animal fibers with vat dyes, the dyeing of cellulose acetate fibers with insoluble dyes, dyeing and printing with aniline black, and the dyeing of leather. In printing pastes they assist in the dispersion of the dye or dye component and facilitate its penetration into the natural or synthetic fiber. The use of solutions of these compounds for increasing the fastness of dyeings on textile materials is an invention of Evans, Piggott and Woolvin which is claimed in application No. 15,910 filed April 11, 1935. The use of solutions of these compounds for increasing the affinity of textile fibers of vegetable origin for acid-chrome dyestuffs is an invention of Rendell and Thomas which is claimed in U. S. Patent No. 2,094,082. The use of these compounds as assistants in resist printing processes is an invention of Howard and Wormald which is covered in U. S. Patent No. 2,090,890.

In the leather industry these compositions function as useful wetting agents in soaking, deliming, bating, tanning, and dyeing baths. They are useful in softening and treating baths for hides and skins, particularly in baths used for fat-liquoring leather. The use of solutions of these compounds in processes of water-proofing leather is an invention of Piggott and White which is claimed in U. S. Patent No. 2,032,097. The use of solutions of these compounds for pre-treating leather prior to dyeing is an invention of Piggott and White which is claimed in U. S. Patent No. 2,044,099.

The dispersing and emulsifying powers of these new compositions give rise to many interesting uses. They may be utilized for converting liquid or solid substances normally insoluble in water, such as hydrocarbons, higher alcohols, pitches, and pitchy substances into clear solutions or stable emulsions or dispersions. They are useful in preparing emulsions of wax and wax-like compositions which are used as leather dressings or floor polishes. They may be used to prepare artificial dispersions of crude, vulcanized, or reclaimed rubber. They may be used as emulsifiers in the manufacture of cosmetic preparations such as cold creams and lip sticks. They may be employed for preparing emulsions of the water-in-oil type such as emulsions of water in such organic solvents as are used in the dry cleaning industry.

These compositions may also be used alone as contact insecticides and for enhancing the spreading and penetrating power of other parasiticides. They may be employed in agricultural sprays in combination with the ordinary insecticides and fungicides. They are useful for promoting the penetrating power of wood preservatives.

In the paper industry these products may be used as penetrants in the liquors used for cooking rags and pulp, and as assistants in paper softening, filling, and processes to increase absorbency.

These compositions may be employed as detergents in several different relations. They may be used in the washing of fruits and vegetables for spray residue removal. They may be used in combination with metal cleaning compounds in neutral, acid, or alkaline liquors. They may be used for paint, varnish, and lacquer cleaners. They may advantageously be employed as cleansing agents in hard water and where a fatty or oily film resists the ordinary cleansing media. They may be added to soap in acid or hard water baths, since these compositions do not form precipitates so readily in hard and acid waters as soaps and Turkey red oils.

These compositions may be used as aids in various chemical reactions. They may be used to control particle size and shape during precipitation or crystallization of compounds from reaction mixtures. They may be used to decrease the particle size of insoluble amine hydrochlorides just before these amines are to be diazotized.

These compositions also have several miscellaneous uses. They may be employed as foam stabilizing agents, especially for use in air-foam fire-extinguishing compositions. They may be used to stabilize rubber latex. They may also be used as frothing and collecting agents in ore flotation processes, and in other processes such as the recovery of fixed oil from the oil sands. The uses mentioned will suggest many similar ones.

By the term "alkyl", as used in this specification and the subjoined claims, reference is made to aliphatic hydrocarbon radicals having the general formulae $C_nH_{2n+1}$ or $C_nH_{2n-1}$.

As many apparently widely different embodiments of this invention may be made without widely departing from the spirit and scope thereof, it is to be understood that the invention is not limited to the specific embodiments thereof except as defined in the appended claims.

I claim:
1. A sulphonium compound having the general formula:

in which R stands for a group which contains an aliphatic radical having a chain of twelve or more carbon atoms; R' denotes an alkyl group; R'' represents a radical containing from one to eight carbon atoms selected from the category consisting of alkyl radicals, aralkyl radicals, and alicyclic radicals; and X stands for an anion.

2. A sulphonium compound having the general formula:

in which R stands for an alkyl group having a chain of twelve or more carbon atoms; R' denotes an alkyl group; R'' represents a radical containing from one to eight carbon atoms selected from the category consisting of alkyl radicals, aralkyl radicals, and alicyclic radicals; and X stands for an anion.

3. A sulphonium compound having the general formula:

in which R stands for an alkyl group having a chain of twelve or more carbon atoms; R' denotes an alkyl group containing less than six carbon atoms; R" represents a radical containing from one to eight carbon atoms selected from the category consisting of alkyl radicals, aralkyl radicals, and alicyclic radicals; and X stands for an anion.

4. A dimethyl alkyl sulphonium methyl sulphate in which the said alkyl group contains a chain of from twelve to eighteen carbon atoms.

5. Dimethyl cetyl sulphonium methyl sulphate.

6. A method of making dimethyl cetyl sulphonium methyl sulphate which comprises heating 100 parts of methyl cetyl sulphide with 47 parts of dimethyl sulphate for one hour at 100° C.

7. Dimethyl dodecyl sulphonium methyl sulphate.

8. A method of making dimethyl dodecyl sulphonium methyl sulphate which comprises heating a mixture of 264 parts of methyl dodecylsulphide and 165 parts of dimethyl sulphate at 90-100° C. until water-soluble.

9. A methyl benzyl alkyl sulphonium methyl sulphate in which the said alkyl group contains a chain of from twelve to eighteen carbon atoms.

10. Methyl benzyl cetyl sulphonium methyl sulphate.

11. A method of preparing methyl benzyl cetyl sulphonium methyl sulphate which comprises heating 100 parts of benzyl cetyl sulphide with 37 parts of dimethyl sulphate at 100° C. until a sample dissolves completely in water.

HENRY ALFRED PIGGOTT.